(No Model.) 4 Sheets—Sheet 1.
H. W. COWAN.
AUTOMATIC GRAIN MEASURE.

No. 379,209. Patented Mar. 13, 1888.

WITNESSES:

INVENTOR:
H. W. Cowan
BY Munn &Co
ATTORNEYS.

(No Model.) 4 Sheets—Sheet 2.

H. W. COWAN.
AUTOMATIC GRAIN MEASURE.

No. 379,209. Patented Mar. 13, 1888.

WITNESSES:

INVENTOR:
H. W. Cowan
BY Munn & Co
ATTORNEYS.

(No Model.) 4 Sheets—Sheet 3.

H. W. COWAN.
AUTOMATIC GRAIN MEASURE.

No. 379,209. Patented Mar. 13, 1888.

WITNESSES:

INVENTOR:
H. W. Cowan
BY Munn & Co
ATTORNEYS.

(No Model.) 4 Sheets—Sheet 4.
H. W. COWAN.
AUTOMATIC GRAIN MEASURE.
No. 379,209. Patented Mar. 13, 1888.
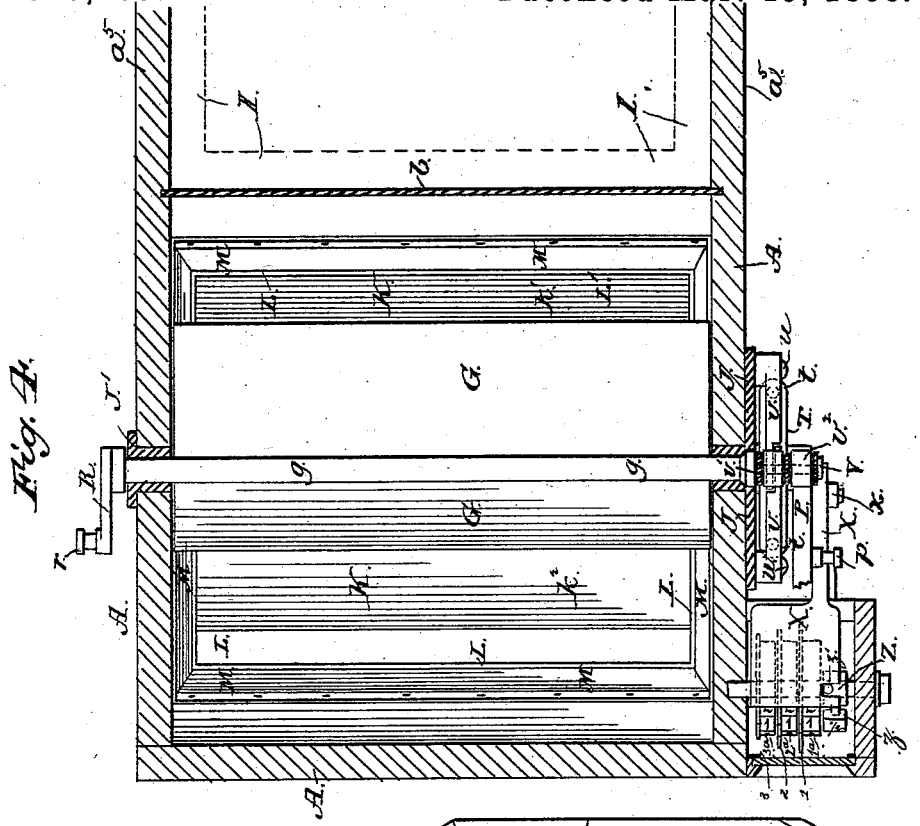
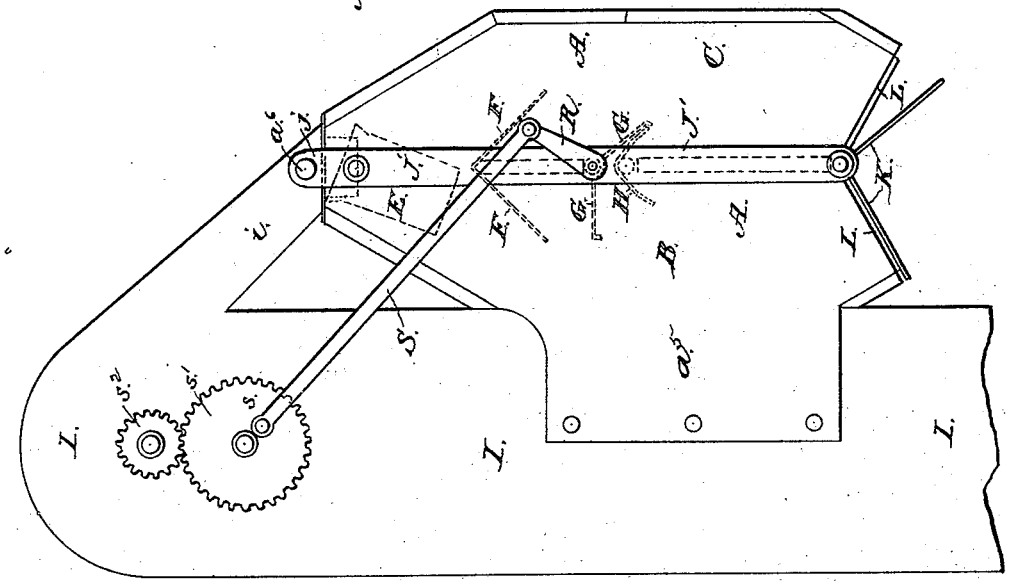
WITNESSES:
INVENTOR:
H. W. Cowan
BY Munn &C.
ATTORNEYS.

United States Patent Office.

HARRY WALLACE COWAN, OF GROS, DAKOTA TERRITORY.

AUTOMATIC GRAIN-MEASURE.

SPECIFICATION forming part of Letters Patent No. 379,209, dated March 13, 1888.

Application filed May 12, 1887. Serial No. 238,011. (No model.)

*To all whom it may concern:*

Be it known that I, HARRY WALLACE COWAN, of Gros, in the county of Day and Territory of Dakota, have invented a new and Improved Automatic Grain-Measure, of which the following is a full, clear, and exact description.

My invention relates to apparatus for automatically measuring grain passing from the elevator of a thrashing-machine, or while being delivered in any other manner; and the invention has for its object to provide a simple, substantial, and effective apparatus of this character which will accurately measure any kind of grain by heaping measure, or the standard most generally satisfactory to thrashermen and grain dealers.

The invention consists in certain novel features of construction and combinations of parts of the grain-measure, all as hereinafter described and claimed.

Reference is to be had to the accompanying drawings, forming a part of this specification, in which similar letters and figures of reference indicate corresponding parts in all the views.

Figure 1:
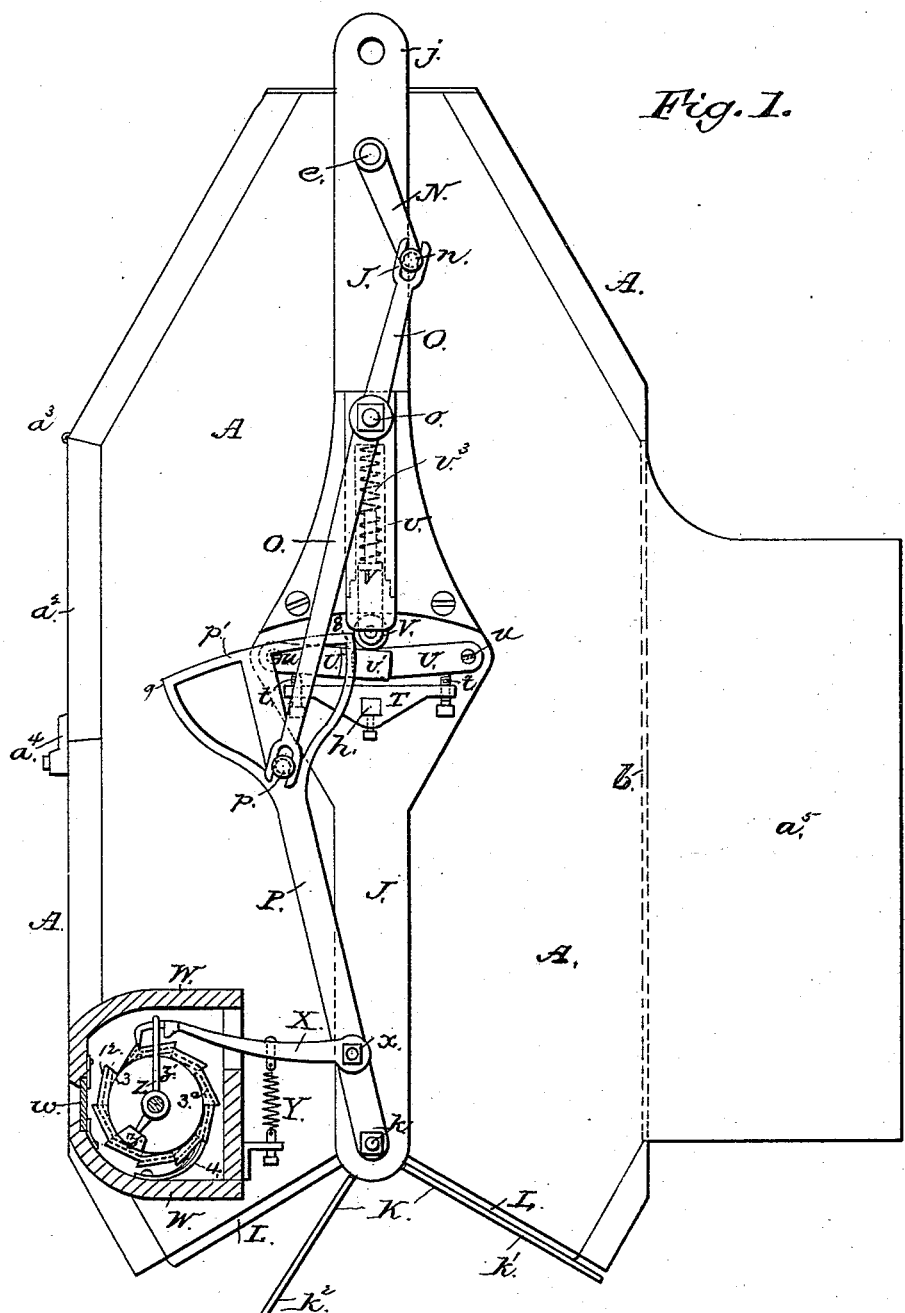
Figure 2:
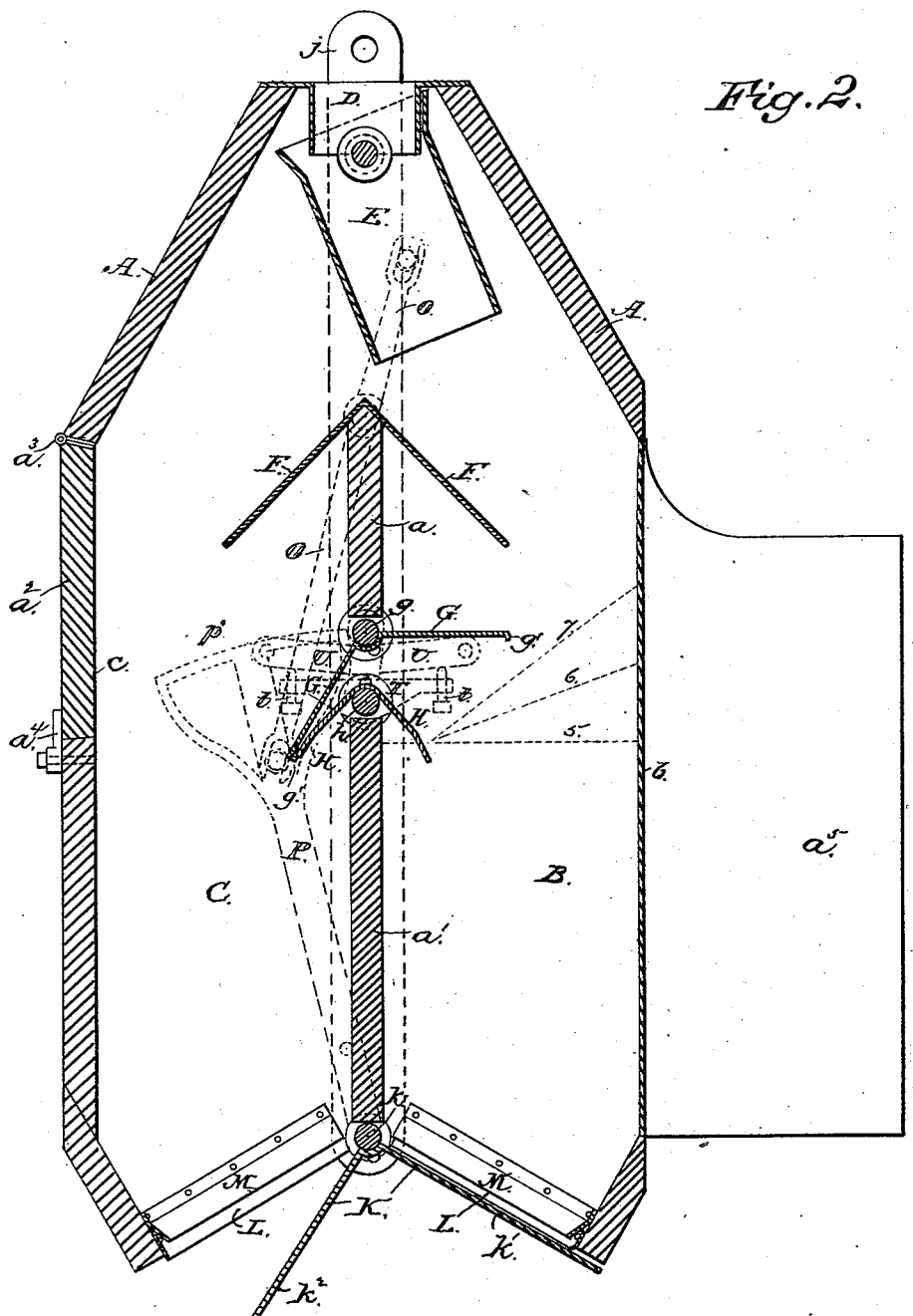
Figure 3:
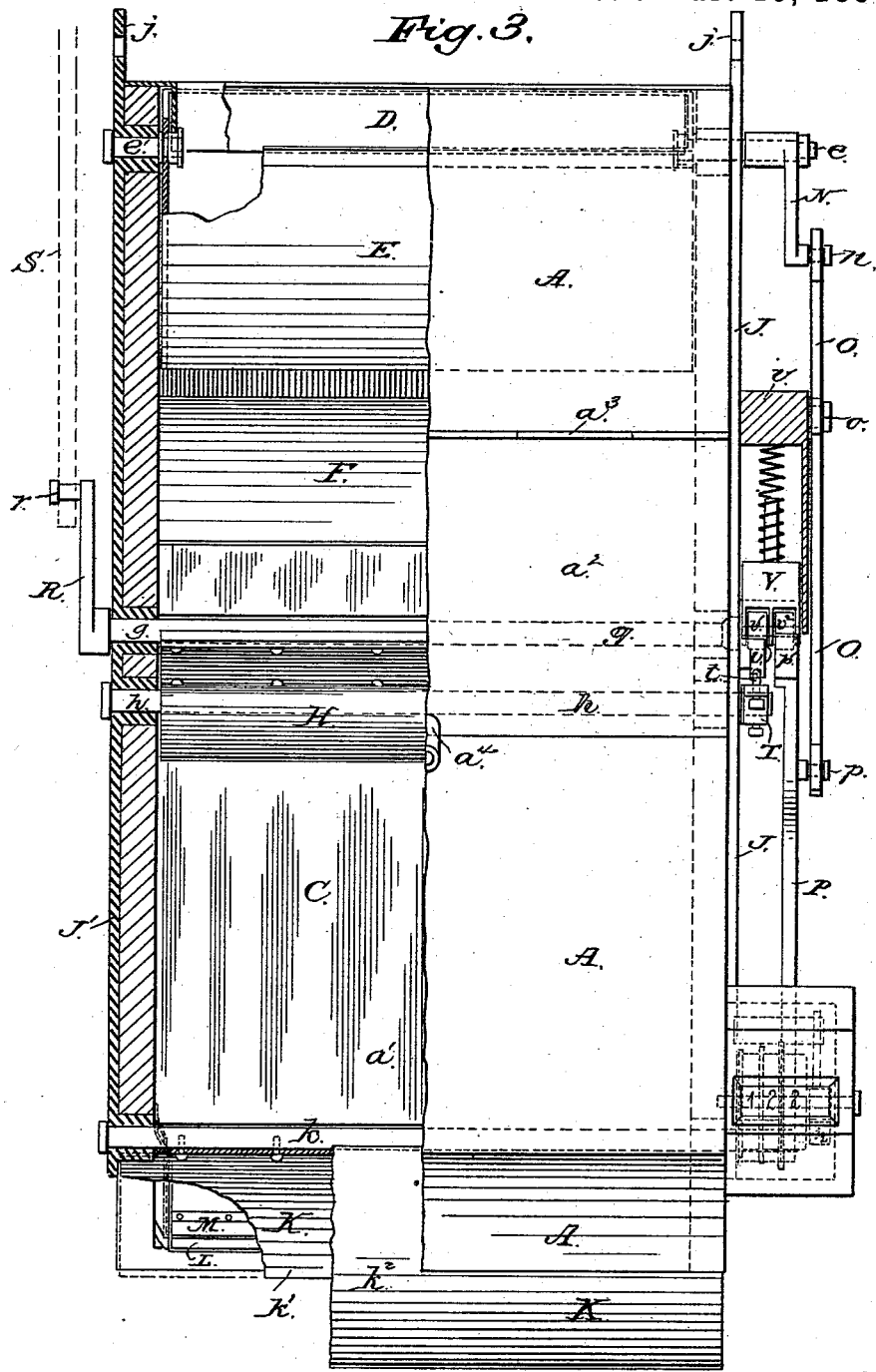

Figure 1 is a side elevation of my improved grain-measure with the register-case in vertical section. Fig. 2 is a central vertical sectional elevation of the measure. Fig. 3 is a front view thereof, partly broken away and in section. Fig. 4 is a sectional plan view of the measure, and Fig. 5 is an elevation showing the opposite side of the measure from that seen in Fig. 1, and illustrates how the apparatus is connected to an elevator from which it receives grain to be measured, and shows also how the vibratory plate of the measure is operated from the elevator mechanism.

The grain-box A of the measure is divided by a central partition formed of two plates, $a$ $a'$, into two compartments, B C, of suitable size to allow a variable heaping half-bushel of different grains to be measured in each compartment, in a manner hereinafter particularly described, and also to give room for an interior grain-conducting neck, D, a tilting throat or funnel, E, a fixed apron, F, a vibratory measuring-plate, G, and a tilting trip-plate, H, all to be presently explained. A portion, $a^2$, of the front of the grain-box is hinged at $a^3$ to allow inspection of the interior apparatus, and is ordinarily latched shut by a button, $a^4$, or other suitable device. The inner or back wall of the box A is preferably a metal plate, $b$, which forms one side of the compartment B, and is preferably slid into grooves in the side walls of the box, and said side walls are extended rearward at $a^5$ $a^5$ to allow the measure to be fastened to the opposite end walls of the shaft or leg I of a grain-elevator by bolts or screws passed through the parts $a^5$ into the shaft, and in position to allow the elevator-spout $i$ to discharge grain into the box, as shown in Fig. 5 of the drawings. Bolts $a^6$, passed through holes in lugs $j$, formed by upward extensions of metal plates or straps J J', fixed to opposite sides of the grain-box, provide a secure fastening of the top of the box to the spout. These plates or straps J J' strengthen the box, and also afford, by inwardly-projecting bosses formed on them, substantial bearings for the pivots or shafts of the funnel E, the measuring and trip plates G H, and the vibratory bottom K of the grain-box, which, by its parts $k'$ $k^2$, alternately closes the two compartments of the box.

When the bottom of a grain measuring or weighing box is arranged to close directly onto the side walls of the box, there is liability of entrance of straws or grain-kernels at the joints, thus preventing complete closure of the bottom and allowing loss of grain, with consequent imperfect measurement or weight registry of the grain. These faults I avoid by placing around the side walls of each compartment of the box a leather or other suitable flexible packing strip or skirt, L, which projects somewhat below the bottom of the box, and against which the bottom K tightly closes without striking the lower edge of the grain-box. To prevent injury to these packing-strips L by the outflowing grain, I attach to the walls of the box A suitable metal guard-plates, M, which overhang the packing-strips, as most clearly shown in Figs. 2 and 4 of the drawings.

The grain throat or funnel E is pivoted by short shafts $e$ $e$, fixed to it, to the box-plates J J', and to the shaft $e$ is fixed a crank-arm, N, to a wrist-pin, $n$, on which is connected the upper slotted or forked end of a lever, O, which is fulcrumed at $o$ to the grain-box or a plate thereon, and is connected by its lower slotted or forked end with a pin, p, fixed to the upper part of a lever or arm, P, which is fixed at its lower end to the shaft k of the double bottom or shutter-plate K, and whereby, as the bottom k' of one closed compartment is opened and the other bottom, k², of the other late open compartment is closed by the discharging grain, the levers P O and arm N will swing the funnel E to cause it to discharge into the closed compartment of the grain-box. In Fig. 2 of the drawings the funnel is set to discharge into the inner or rear compartment, B, of the box.

The apron F is arranged across the box a little below the funnel E, and is about right angular in cross-sectional form, and is fixed at its apex to the upper division-wall, a, of the grain-box, whereby the grain falling from the funnel into either compartment of the box will be deflected against the outer or farther walls, b c, of the compartments, and thereby cause the grain, as the compartment fills to the required extent, to assume an angle peculiar to itself from the said walls b c downward and inward toward the trip-plate H. The apron F also forms a cover or guard to the vibratory measuring-plate G below it.

The measuring-plate G, which preferably extends clear across the box A, is fixed at its central part to its shaft g, and the opposite side parts of the plate, which together have an obtuse angular cross-sectional general form, project into the two compartments B C of the grain-box and may have pendent lips g' at their outer edges. To the shaft g is fixed a crank-arm, R, to a wrist, r, of which is connected one end of a pitman-rod, S, the other end of which is connected to a wrist-pin, s, fixed to a gear-wheel, s', which meshes with a pinion, s², fast on the upper shaft of the elevator-bucket belt; or the rod S may be connected directly to a wrist on the pinion s² should the elevator-belt not be driven too fast, whereby a vibratory motion will be imparted to the measuring-plate G by the elevator-driving mechanism and at a preferred speed of vibration of about one hundred and twenty complete strokes per minute.

The trip-plate H preferably extends clear across the grain-box, and has about a right-angular general form in cross-section, and is fixed at its center to its shaft h, so as to project at a downward incline into each of the compartments B C of the grain-box and in such position relatively to the measuring-plate G that the latter on its downstroke in each compartment will approach quite closely to the outer lower edge of the plate H without touching it. The lower edges of the opposite side parts of the plate H are bent a little out of the plane of the main faces of the plate, so as to be parallel flatwise with the under faces of the lowered opposite sides of the measuring-plate G, and thereby prevent drawing up of grain between the plates, which would be liable to occur were the lower edges of the trip-plate at an angle with the lowered outer edges of the measuring-plate, as will be understood from Fig. 2 of the drawings.

To one end of the trip plate shaft h a bar or plate, T, is fixed, and screws t t, threaded into the opposite ends of the bar, are each adapted to lift a trip rod, U, which is pivoted at its outer end at u to the grain-box or its plate J, and thereby force upward a latch, V, which is fitted to slide in a case, v, and preferably is provided at its lower end with two anti-friction rollers, v' v², the former bearing upon the inner ends of both the trip-rods U U, and the latter adapted to form a stop to either end of a cross-bar, p', which is fixed and braced to the upper end of the lever P, to which the funnel and bottom E K are connected for simultaneous operation, as above described.

The latch V is normally forced down to the trip-rods U U, and in front of one end of the lever cross-bar or head p', by a spring, v³, although the latch may operate by gravity alone, if preferred. It is obvious that the latch need not have the rollers v' v²; but their use relieves friction and thereby promotes delicate and prompt action of the tripping devices, and such action is promoted or assured by the contact of the screws t t with either of the trip-rods U U at points near the fulcrums or pivots u of the rods, and whereby a slight vibration or downward movement of either side of the trip-plate H, and consequent upward movement of one end of the cross-bar T and screw t, will suffice to lift the latch above the end of the bar p' and allow the grain to discharge from one compartment of the box, as hereinafter more fully explained.

It is also obvious that the opposite ends of the cross-bar T may be shaped to act directly on the trip-bars U, and the screws t would then be dispensed with; but I prefer to use the screws or equivalent adjustable pins, as they may be set in or out to nicely regulate the movements of the trip-bars and the latch with relation to each other and the lever P, and also provide means for taking up wear of the parts to maintain a sensitive or delicate response of the tripping mechanism to the tilting motions of the trip-plate.

The registering device, which indicates the number of bushels of grain measured in the box A, consists of a series of round peripherally toothed or notched plates, 1 2 3, made successively smaller in diameter and carrying, respectively, disks 1ª 2ª 3ª, each having ten numerals, or nine digits and a cipher, at its peripheral face. There are ten notches in each disk-plate to correspond with the numerals on the disks, and springs 4, fixed to the register-case W, made fast to the box A, engage the notches or teeth of the disk-plates to prevent back motion of the disks, while a pawl, X, which is pivoted at x to the lever P, is carried backward by the lever after each forward movement of the pawl by the lever has turned one or more of the register-disks the distance of one tooth for carrying a new figure or figures in front of the glass plate w, fixed in the register-case, and through which the count may be seen.

The pawl X is adapted to engage all three of the notched disk-plates at once, but will engage the largest plate, 1, only, until it enters a notch therein deep enough to allow it to also engage one of the notches of the next smaller plate, 2, to indicate successive tens of bushels, until it enters notches in plates 1 and 2 deep enough to allow it to engage one of the notches of the smallest plate, 3, to indicate successive hundreds up to one thousand bushels of grain. A spring, Y, connected to the pawl X, normally holds it into the notches of the disk-plates.

A lever, Z, placed loosely on the shaft of the disks, has a head, z, on the outer end or face of which the fraction ½ is marked, and the stem z' of the lever enters a notch in the head of the pawl X, and whereby, as the pawl is pushed outward to carry the next higher numeral to view, the fractional mark ½ will be moved out of sight; and when the pawl is drawn backward, when the next half-bushel is measured, the head of the lever Z will be swung upward to bring the fraction to view at the glazed opening of the register-case, the register thus indicating bushels and half-bushels of grain as the measuring proceeds.

Before describing briefly the continuous operation of this apparatus, it is well to state that both "stroke" measure and measure by weight are in some respects objectionable to thrashermen and grain-dealers, and that the usual heaping measure, or what will remain heaped up on a half-bushel measure of any kind of grain, has proved to be most generally acceptable; and it is a measurement of grain automatically to conform to this latter standard which I obtain by my apparatus. Different grains will heap up less or more above the top of a measure. Flax, for instance, being very facile, will heap up very little, while oats will heap up considerably above the top of the measure, and wheat, barley, rye, or other grains will heap up to varying degrees or heights before running over.

Referring now to the dotted line 5 across the compartment B in Fig. 2 of the drawings, and which is a little above the lower edge of the trip-plate H, I remark that the two compartments B C of the grain-box are of such size that grain filled into them level with the line 5 would exactly fill a half bushel measure if struck off level with its top; or, in other words, the line 5 indicates a standard half-bushel in stroke measure. The dotted line 6 indicates the extent to which flax would pile up on an incline from the wall b to the point where the line 5 meets the trip-plate before reversal of the grain-delivering funnel and discharge of the grain, and the dotted line 7 indicates the extent to which oats would pile up before discharge of the grain. Grain filling into the compartment between the lines 5 and 6 would, in quantity, equal the amount of flax which would heap up on a half-bushel measure, and grain filling a space between the lines 5 and 7 would equal the amount of oats which would heap up on a half-bushel measure.

The operation of the apparatus is as follows: We will suppose that the lever P is swung over toward the front, and its shoulder 8 is retained by the latch V. The part k' of the bottom plate, K, will then be raised to close the compartment B, and the lever O will have swung the funnel E over to discharge into this compartment, and the pawl X in its last movement has carried a next higher numeral to view at the opening w of the register-case and has swung the lever Z to conceal the fraction ½ on its face, all as will be understood from Figs. 1 and 2 of the drawings. It will be understood that the measuring-plate G is being continuously vibrated, as hereinbefore described, and that the grain—oats, for instance—is being discharged from the elevator into the compartment B of the grain-box. The resistance offered by the oats lodged onto the trip-plate H to the downward movement of the plate will be insufficient to cause depression or tilting of the trip-plate H by the plate G until the oats pile up in the box to the line 7, and the instant this occurs the trip-plate will be rocked and will lift the left-hand trip-bar U, and thereby raise the latch V and allow the lever P to swing over toward the right hand as the part k' of the bottom plate, K, opens, and the opposite part, k², of the plate K closes the bottom of the compartment C and the funnel E is swung over to discharge into said compartment, while the lever P is locked by the descent of the latch V in front of the shoulder 9 at the other end of the cross-head p' of the lever. This movement of the lever has drawn the pawl X backward, thereby swinging the lever Z to display the fraction ½ at the register-opening, and also has reset the pawl X into the next rearward tooth or teeth of the register disk plates ready to move them to display a next higher numeral the next time the lever P is reversed.

The operation of the measuring-plate G relatively with the trip-plate H in the compartment C is similar to its action in the compartment B, as above described, and when the oats pile up on the trip-plate, to cause its depression or tilting by the plate G, the right-hand trip bar U will lift the latch V and release the lever P, which then will swing over and be locked by the latch at its shoulder 8, and the funnel E and part k' of the bottom plate, K, will resume their first-described positions, ready for again measuring the grain in the compartment B, and the forward motion of the lever P will have moved the pawl X to show a next higher numeral at the register and carry the fraction ½ on the lever Z out of sight. The division-wall a prevents the vibrating measuring-plate G throwing the grain over into the compartment not being filled.

I wish it to be understood that the trip-plate H, arranged with the cross-bar T and bars U U, is but a preferred arrangement of mechanism for working a device retaining the lever P, connected to the bottom plate and funnel by or through the direct action of the vibrating measuring-plate G, as this measuring-plate is the essential or most important feature of my invention, and by its direct action on the grain filling into the box is adapted for tripping the lever P, to allow filling and discharge of the compartments of the grain-box, by the aid or intervention of mechanism other than that herein particularly described for the purpose.

Having thus fully described my invention, I claim as new, and desire to secure by Letters Patent—

1. A grain-measure constructed with a box in which the grain is measured, and a vibratory measuring-plate operating on the grain filling into the box for actuating tripping devices connected with the tilting bottom of the box, substantially as described, whereby the bottom of the box will be opened automatically by or through the pressure of the measuring-plate on the grain, as set forth.

2. A grain-measure constructed with a grain-box having two compartments and a tilting bottom adapted to close and open the compartments alternately, a vibratory measuring-plate operating on the grain filled into each compartment, and tripping devices connected with the measuring-plate and the tilting bottom of the box, substantially as described, whereby the bottom of the box will be tilted to automatically discharge the grain from each compartment by or through the pressure of the measuring-plate on the grain, as set forth.

3. A grain-measure constructed with a grain-box having two compartments and a tilting bottom adapted to close and open the compartments alternately, a tilting funnel adapted to discharge grain into either compartment, devices connecting the tilting bottom and funnel to operate both simultaneously for alternately filling and emptying the compartments, a vibratory measuring-plate operating on the grain filled into either compartment, and tripping devices connected with the measuring-plate and the tilting bottom of the box, substantially as described, for the purposes set forth.

4. In a grain-measure, the combination, with a grain-box and a vibratory measuring-plate fitted therein, of an apron or guard fitted above the measuring-plate, substantially as shown and described, whereby the measuring-plate will be protected from direct downflow of the grain, and the grain will be deflected to pile up at or against the farther wall of the box, as and for the purposes herein set forth.

5. In a grain-measure, the combination, with a grain-box having two compartments, of a vibratory measuring-plate extending into both compartments, and a double inclined apron or guard fitted above the measuring-plate to protect it from the downflowing grain and deflect the grain to the farther walls of both compartments of the box, substantially as herein shown and described.

6. In a grain-measure, the combination, with a grain-box and a vibratory measuring-plate fitted therein, of a trip-plate pivoted below the measuring-plate and adapted to be tilted by pressure of the measuring-plate, and trip devices connecting the trip-plate with the tilting bottom of the grain-box, substantially as shown and described, whereby the depression of the trip-plate by or from the measuring-plate will open the box for discharging the grain, as herein set forth.

7. In a grain-measure, the combination, with a grain-box having two compartments and a tilting bottom adapted to close the compartments alternately, and a vibratory measuring-plate fitted in the box and operating on the grain in both compartments, of a trip-plate pivoted below the measuring-plate and extended into both compartments, and devices connecting the trip-plate with the bottom of the grain-box, substantially as shown and described, whereby the box-bottom will be operated automatically to discharge the grain from each compartment by the depression of the trip-plate by or from the vibratory measuring-plate, as herein set forth.

8. In a grain-measure, the combination, with a grain-box having a tilting bottom and a lever connected to the bottom shaft or axis, of a vibratory measuring-plate operating on the grain filled into the box, a tilting trip-plate arranged below the measuring-plate, and a tripping and latch device consisting of a bar fixed to the trip-plate shaft, a pivoted bar or lever adapted to be lifted by the trip-shaft bar, and a latch adapted to be operated by the pivoted bar and to lock against shoulders at the swinging end of the bottom lever, substantially as described, for the purposes set forth.

9. In a grain-measure, the combination, with a grain-box, A, having two compartments, B C, and a tilting bottom, K, of a lever, P, connected to the bottom shaft, k, and provided with shoulders 8 9 at its swinging end, a vibratory measuring-plate, G, extending into both compartments B C, a tilting trip-plate, H, extending into both compartments, a cross-head, T, fixed to the shaft of plate H, pivoted trip-bars U U, and a latch, V, adapted to be lifted by either of the trip-bars and to lock at either shoulder 8 9 of the lever P, substantially as described, for the purposes set forth.

10. In a grain-measure, the combination, with the grain-box A, having a tilting bottom, K, measuring and trip plates G H, pivoted in the box, a lever, P, fixed to the bottom shaft, k, and having shoulders 8 9, a latch, V, adapted to engage said shoulders, trip-bars U, pivoted to the box and adapted to lift the latch, and a cross-bar, T, on the trip-plate shaft, of screws t or adjustable pins fitted in bar T and adapted to operate the latch trip-bars U, substantially as described, for the purposes set forth.

11. In a grain-measure, the combination, with the box A, having two compartments, B C, and a tilting bottom, K, of a tilting funnel, E, a lever, P, fixed to the bottom shaft or axis and having shoulders 8 9, a lever, O, pivoted to the box and connected to the funnel and to the lever P, to simultaneously actuate the funnel and tilting bottom, a measuring-plate, G, pivoted below the funnel, a trip-plate, H, pivoted below the measuring-plate, a cross-bar, T, on the trip-plate shaft, trip-bars U U, pivoted to the box, and a latch, V, adapted to lock against either shoulder 8 9 of the bottom lever, P, substantially as described, for the purposes set forth.

12. The combination, with the trip-plate cross-bar T, the trip-bars U, and the bottom lever, P, of a latch, V, provided with anti-friction rollers $v'$ $v^2$, substantially as described, for the purposes set forth.

13. In a grain-measure, the combination, with the grain-box and a vibratory measuring-plate fitted therein for operation on the inflowing grain to actuate tripping devices for automatically opening the bottom of the box, substantially as specified, of driving mechanism connecting the measuring-plate with the mechanism of an elevator discharging grain into the measure, substantially as herein set forth.

14. A grain-measure constructed with a grain-box, A, held to the leg or shaft I of an elevator and receiving grain therefrom, a vibratory measuring-plate fitted in the box for operation on the inflowing grain to trip the bottom of the box to discharge its contents, a crank, R, on the measuring-plate shaft, and a rod, S, connecting said crank with a drive-wheel of the elevator, substantially as shown and described.

15. The combination, with the lever P, connected to the tilting bottom of the grain-box, of a registering device comprising a pawl, X, pivoted to the lever, a series of successively-smaller and peripherally-notched plates, 1 2 3, carrying numbered disks $1^a$ $2^a$ $3^a$, engaged by the pawl, and a lever, Z, hung on the disk-plate shaft and connected at one end with the pawl and carrying a fraction-mark, $\frac{1}{2}$, at its other end, substantially as described, for the purposes set forth.

HARRY WALLACE COWAN.

Witnesses:
BENJAMIN P. COWAN,
JOSEPH J. COWAN.